(12) United States Patent
Haartsen

(10) Patent No.: US 8,024,013 B2
(45) Date of Patent: Sep. 20, 2011

(54) REGULATING POWER DUTY CYCLE OF AN RF TRANSMITTER/RECEIVER RESPONSIVE TO DISTANCE MOVED

(75) Inventor: Jacobus Cornelis Haartsen, Hardenberg (NL)

(73) Assignee: Sony Ericsson Mobile Communications AB, Lund (SE)

( * ) Notice: Subject to any disclaimer, the term of this patent is extended or adjusted under 35 U.S.C. 154(b) by 624 days.

(21) Appl. No.: 12/169,893

(22) Filed: Jul. 9, 2008

(65) Prior Publication Data

US 2010/0009643 A1 Jan. 14, 2010

(51) Int. Cl.
*H04B 1/40* (2006.01)
(52) U.S. Cl. .................................. 455/574; 455/127.5
(58) Field of Classification Search .................. 455/574, 455/414.1, 423, 456.1, 572, 127.1, 127.5
See application file for complete search history.

(56) References Cited

U.S. PATENT DOCUMENTS

| | | | |
|---|---|---|---|
| 4,731,869 A * | 3/1988 | Farrer | 455/127.1 |
| 5,539,647 A | 7/1996 | Shibata et al. | |
| 6,029,111 A | 2/2000 | Croyle | |
| 7,251,493 B2 | 7/2007 | Camp, Jr. et al. | |
| 2003/0008671 A1 | 1/2003 | Lundgren et al. | |
| 2004/0198386 A1 | 10/2004 | Dupray | |
| 2005/0113124 A1 * | 5/2005 | Syrjarinne et al. | 455/522 |
| 2006/0119508 A1 | 6/2006 | Miller | |
| 2007/0287510 A1 * | 12/2007 | Nader et al. | 455/574 |
| 2009/0278738 A1 * | 11/2009 | Gopinath | 342/357.12 |

FOREIGN PATENT DOCUMENTS

| | | |
|---|---|---|
| DE | 198 31 627 A1 | 1/2000 |
| EP | 1 028 598 A1 | 8/2000 |
| EP | 1 063 837 A2 | 12/2000 |
| EP | 1 205 896 A2 | 5/2002 |
| EP | 1 221 586 A2 | 7/2002 |
| EP | 1 662 358 A1 | 5/2006 |
| EP | 1662358 A1 * | 5/2006 |
| WO | WO 01/20260 A1 | 8/2001 |

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/IB2009/050095, May 14, 2009.
Kao "Integration of GPS and Dead-Reckoning Navigation Systems" *IEEE Vehicle Navigation and Information Systems Conference*, Oct. 20-23, 1991, pp. 635-643.

* cited by examiner

*Primary Examiner* — Blane J Jackson
(74) *Attorney, Agent, or Firm* — Myers Bigel Sibley & Sajovec, P.A.

(57) ABSTRACT

Various methods and associated wireless communication mobile terminals are provided that repetitively switch power on and off to a RF transmitter and/or to a RF transceiver, and that regulate the power duty cycle in response to movement of the associated communication terminal. Movement of the communication terminal may be sensed in response to an acceleration signal from an accelerometer, a position signal from a GPS receiver, a light level signal from an ambient light sensor, and/or a pressure level signal from a pressure sensor.

10 Claims, 4 Drawing Sheets

REGULATING POWER DUTY CYCLE OF AN RF TRANSMITTER/RECEIVER RESPONSIVE TO DISTANCE MOVED

BACKGROUND OF THE INVENTION

The present invention relates to wireless communication mobile terminals and, more particularly, to methods and apparatus that reduce power consumption in a wireless communication mobile terminal.

Extension of battery life continues to be important goal in the design of wireless mobile communication terminals (communication terminals). To reduce the power consumed by a communication terminal when it is not actively carrying out communications with another terminal, the communication terminal can cycle between a sleep mode and an active mode. In the sleep mode, communication circuitry that is used for communication with another terminal via a cellular network is powered off to conserve power. Such communication circuitry can include a high-frequency temperature-compensated crystal oscillator (TCXO), transmitter circuitry, and receiver circuitry.

A mobile network may be configured to page the communication terminal during predefined discrete intervals using a slotted paging channel. For example, in a WCDMA system or a Universal Mobile Telephone System (UMTS), these discrete intervals occur during "paging occasions" when the cellular network transmits a paging indication channel (PICH) that contains 10-millisecond frames, with each frame having 288 bits.

Thus, in order to detect incoming calls, a communication terminal must periodically transition from the sleep mode to an active mode to monitor the paging channel for pages and/or other commands from the cellular network. The communication terminal may also be required to periodically transition from the sleep mode to the active mode to generate and transmit timing alignment updates to the cellular network, to search for adjacent cells for handover decisions, and/or to determine and send geographic location updates to the cellular network.

The duty cycle between the duration of the higher-power active mode relative to the duration of the sleep mode can substantially affect the battery life of the communication terminal.

SUMMARY OF THE INVENTION

Various methods and associated wireless communication mobile terminals are provided that repetitively switch power on and off to a RF transmitter and/or to a RF transceiver, and that regulate the power duty cycle in response to movement of the associated communication terminal.

A method for regulating power in a wireless communication terminal according to some embodiments of the present invention includes repetitively switching power-on and power-off to a RF transmitter circuit and/or a RF receiver circuit. Movement of the wireless communication terminal from a previous location is sensed. The power-on to power-off duty cycle of the RF transmitter circuit and/or the RF receiver circuit is regulated in response to the sensed movement.

In some further embodiments, the distance that is moved by the communication terminal is sensed in response to acceleration information from an acceleration sensor in the communication terminal. The power-on to power-off duty cycle is regulated by decreasing the duty cycle in response to determining from the acceleration information that the distance is less than a threshold distance.

In some further embodiments, the power-on to power-off duty cycle is further regulated by increasing the power-on to power-off duty cycle in response to determining from the acceleration information that the distance is greater than the threshold distance.

In some further embodiments, sensing of the movement includes determining velocity of the communication terminal over a defined time in response to acceleration information from the acceleration sensor in the communication terminal. The power-on to power-off duty cycle is regulated in response to the velocity determined from the acceleration information. Regulation of the power-on to power-off duty cycle can include increasing the power-on to power-off duty cycle of the RF transmitter circuit and/or the RF receiver circuit in response to the determined velocity exceeding a threshold velocity, and decreasing the power-on to power-off duty cycle in response to the determined velocity being less than the threshold velocity.

In some further embodiments, the RF transmitter circuit is configured to encode and transmit a signal according to at least one cellular communication protocol. The RF receiver circuit is configured to receive and decode a signal according to the at least one cellular communication protocol. Sensing of the movement can include sensing distance moved by the communication terminal using global position system (GPS) signals received by a GPS receiver in the communication terminal. Regulation of the power-on to power-off duty cycle can include decreasing the power-on to power-off duty cycle in response to determining that the distance is less than a threshold distance, and increasing the power-on to power-off duty cycle in response to determining that the distance is greater than the threshold distance.

In some further embodiments, sensing of the movement can include sensing change in level of ambient light that is incident to a light sensor of the communication terminal. Regulation of the power-on to power-off duty cycle can include regulating the power-on to power-off duty cycle of the RF transmitter circuit and/or the RF receiver circuit in response to the sensed change in ambient light level.

Regulation of the power-on to power-off duty cycle can include decreasing the power-on to power-off duty cycle in response to the level of ambient light changing less than a threshold amount during a threshold time, and increasing the power-on to power-off duty cycle in response to the level of ambient light changing more than the threshold amount during a threshold time.

In some further embodiments, sensing of the movement can include sensing change in level of ambient air pressure using a pressure sensor in the communication terminal. Regulation of the power-on to power-off duty cycle can include regulating the power-on to power-off duty cycle of the RF transmitter circuit and/or the RF receiver circuit in response to the sensed change in ambient air pressure.

Regulation of the power-on to power-off duty cycle can include decreasing the power-on to power-off duty cycle in response to the level of ambient air pressure changing less than a threshold amount during a threshold time, and increasing the power-on to power-off duty cycle in response to the level of ambient air pressure changing more than the threshold amount during a threshold time.

In some further embodiments, the RF transmitter circuit is configured to encode and transmit a signal according to at least one cellular communication protocol, and the RF receiver circuit is configured to receive and decode a signal according to the at least one cellular communication protocol. Sensing of the movement can include searching for signals from WLAN devices. Regulation of the power-on to power-off duty cycle of the RF transmitter circuit and/or the RF receiver circuit can include increasing the power-on to power-off duty cycle in response to newly discovered signals from a WLAN device that is separate from the communication terminal, and decreasing the power-on to power-off duty cycle in response to detecting absence of signals from the previously discovered WLAN device.

In some further embodiments, the RF transmitter circuit is configured to encode and transmit a signal according to at least one cellular communication protocol, and the RF receiver circuit is configured to receive and decode a signal according to the at least one cellular communication protocol. Sensing of the movement can include searching for signals from Bluetooth devices. Regulation of the power-on to power-off duty cycle of the RF transmitter circuit and/or the RF receiver circuit can include increasing the power-on to power-off duty cycle in response to newly discovered signals from a Bluetooth device that is separate from the communication terminal, and decreasing the power-on to power-off duty cycle in response to detecting absence of signals from the previously discovered Bluetooth device.

In some further embodiments, the RF transmitter circuit is configured to encode and transmit a signal according to at least one cellular communication protocol, and the RF receiver circuit is configured to receive and decode a signal according to the at least one cellular communication protocol. Sensing of the movement can include searching for signals from WLAN devices and/or Bluetooth devices. Regulation of the power-on to power-off duty cycle of the RF transmitter circuit and/or the RF receiver circuit can include decreasing the power-on to power-off duty cycle in response to discovering signals from a WLAN device and/or a Bluetooth device that is known to be associated with a previously determined location where the communication terminal remained substantially stationary for at least a threshold time. The power-on to power-off duty cycle can then be increasing in response to detecting absence of signals from the previously detected WLAN device and/or the Bluetooth device.

In some further embodiments, the repetitive switching of power-on and power-off can include: maintaining the RF transmitter circuit powered-off in response to the communication terminal determining that it has moved less than a threshold distance from a previous location; repetitively switching power-on and power-off to the RF transmitter circuit in response to the communication terminal determining that it has moved more than the threshold distance from the previous location; maintaining the power-on to power-off duty cycle of the RF receiver circuit below a defined level in response to the communication terminal determining that it has moved less than the threshold distance from the previous location; and maintaining the power-on to power-off duty cycle of the RF receiver circuit above the defined level in response to the communication terminal determining that it has moved more than the threshold distance from the previous location. A control channel from a cellular network can be monitored for incoming calls to the communication terminal in response to powering-on of the RF receiver circuit and the communication terminal determining that it has moved less than the threshold distance from the previous location.

In some further embodiments, in response to the communication terminal determining that it has moved less than a threshold distance from a previous location, the power-on to power-off duty cycle of the RF transmitter circuit can be separately controlled relative to the RF receiver circuit to cause the RF transmitter circuit to cycle between power-on and power-off at a lower rate than the RF receiver circuit.

In response to the communication terminal determining that it has moved less than the threshold distance from the previous location, the power-on to power-off duty cycle of the RF transmitter circuit can be controlled to cause the RF transmitter circuit and the RF receiver circuit to be concurrently powered-on during intervals that repeat at a defined rate.

While the RF transmitter circuit and the RF receiver circuit are concurrently powered-on during the intervals, the RF receiver circuit can be operated to receive downlink timing information from a cellular network. Uplink timing alignment information can be generated in response to the received timing information. The uplink timing alignment information can be transmitted via the RF transmitter circuit to the cellular network.

A cell search rate, at which the communication terminal searches for new cellular base station identifiers that are within range of the RF receiver circuit, can be maintained below a threshold rate in response to the communication terminal determining that it has moved less than the threshold distance from the previous location. The cell search rate can be maintained above the threshold rate in response to the communication terminal determining that it has moved more than the threshold distance from the previous location. Alternatively, the number of base stations that are tracked during a cell search and, therefore, the time that the receiver circuit is powered-on to receive signal may be increased or decreased in response to movement of the terminal.

One or more repetition timing intervals for carrying out operations to monitor a paging channel, cell search operations, timing alignment operations, and/or location update operations can be controlled in response to the sensed movement of the wireless communication terminal. A number of base stations that are tracked by the wireless communication terminal can be controlled in response to the sensed movement of the wireless communication terminal.

Some other embodiments of the present invention are directed to a wireless communication terminal that includes a RF transmitter circuit, a RF receiver circuit, a movement sensor, and a controller circuit. The RF transmitter circuit is configured to transmit signals to a cellular base station. The RF receiver circuit is configured to receive signals from the cellular base station. The movement sensor is configured to sense distance moved by the wireless communication terminal from a previous location in response to an acceleration signal from an accelerometer, a position signal from a GPS receiver, a light level signal from an ambient light sensor, and/or a pressure level signal from a pressure sensor. The controller circuit is configured to repetitively switch power-on and power-off to the RF transmitter and receiver circuits, to decrease the power-on to power-off duty cycle of the RF transmitter and receiver circuits in response to determining that the sensed distance is less than a threshold distance, and to increase the power-on to power-off duty cycle of the RF transmitter and receiver circuits in response to determining that the sensed distance is more than the threshold distance. The controller circuit is further configured to separately control the power-on to power-off duty cycle of the RF transmitter circuit relative to the RF receiver circuit to cause the RF transmitter circuit to cycle between power-on and power-off at a lower rate than the RF receiver circuit and to cause the RF transmitter circuit and the RF receiver circuit to be concurrently powered-on during intervals that repeat at a defined rate while the sensed distance is less than the threshold distance.

Other electronic devices and/or methods according to embodiments of the invention will be or become apparent to one with skill in the art upon review of the following drawings and detailed description. It is intended that all such additional electronic devices and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
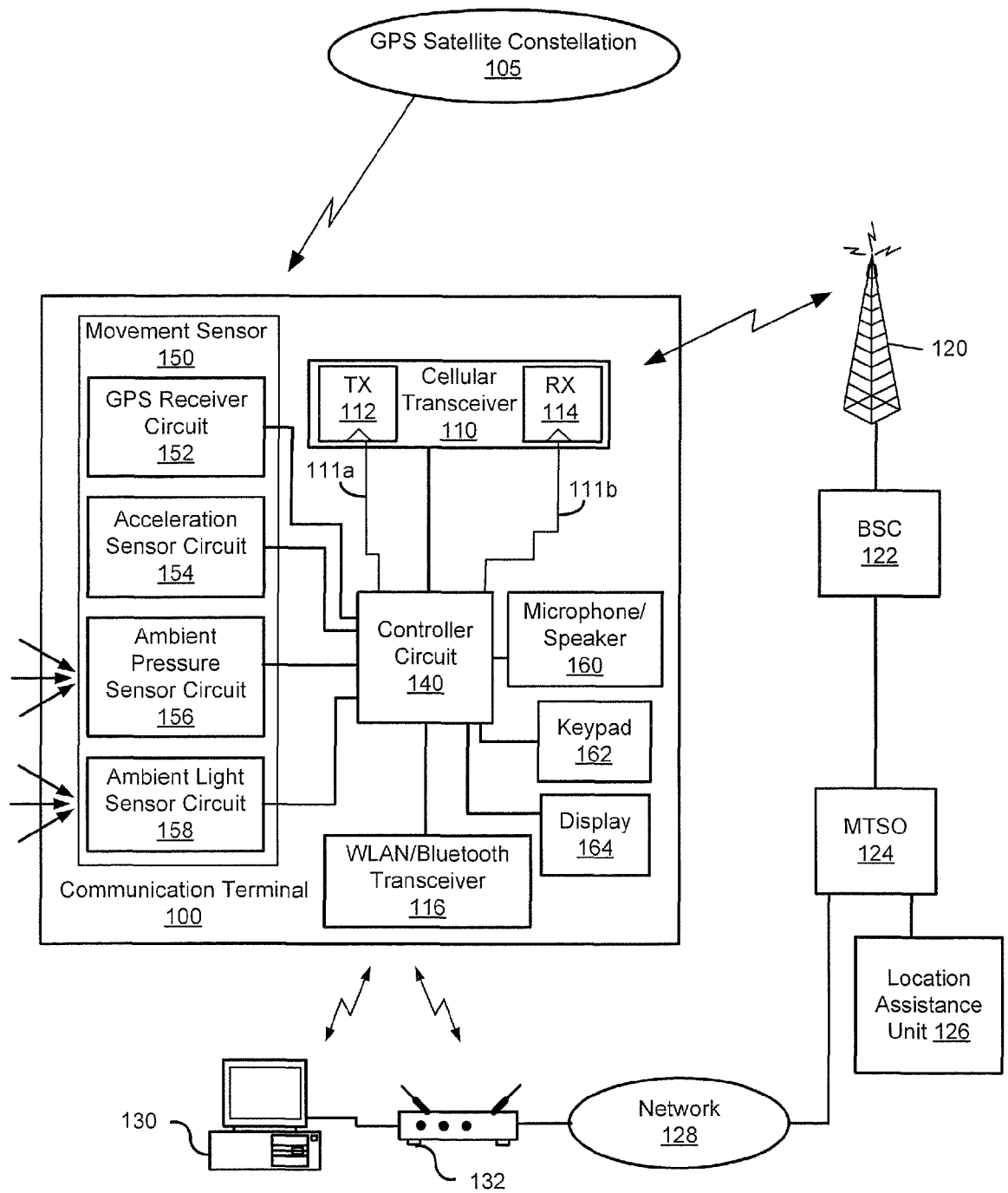
FIG. 1 is a schematic block diagram of an exemplary communication terminal that regulates the power duty cycle of RF transmitter and/or RF receiver circuitry in response to movement of the communication terminal in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

FIG. 1 illustrates an exemplary communication terminal 100 that includes a cellular transceiver 110, a microphone/speaker 160, a keypad 162, and a display 164, which are controlled by a controller circuit 140. The controller 140 may include a general purpose processor and/or digital signal processor which can execute instructions from a computer readable memory that carry out at least some of the functions described herein.

The cellular transceiver 110 communicates with base stations of a cellular network across a wireless RF interface. The cellular transceiver 110 can be configured to encode/decode and transmit and receive RF communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), WiMAX, and/or Long Term Evolution (LTE). The exemplary cellular network includes base stations, one of which is shown as base station 120, a base station controller (BSC) 122, a mobile terminal switching office (MTSO) 124, and a mobile terminal location assistance unit 126. Accordingly, the cellular transceiver 110 may include a digital signal processor (DSP) and analog circuitry (e.g., RF modulators/demodulators, amplifiers, etc.).

The communication terminal 100 may be further configured to communicate via a Wireless Local Area Network (WLAN)/Bluetooth transceiver 116 with other communication devices, such as the exemplary Bluetooth communication device 130 and/or WLAN communication device 132 which, in turn, may communicate with the cellular network via a Private/public network (e.g., Internet) 128.

The controller 140 is configured to conserve power (e.g. from a battery) within the communication terminal 100 by repetitively switching between a sleep mode, during which at least a portion of the cellular transceiver 110 and/or the WLAN/Bluetooth transceiver 116 is powered-off, and a higher power active mode, during which the cellular transceiver 110 and/or the WLAN/Bluetooth transceiver 116 is powered-on. Accordingly, although various embodiments are described in the context of regulating the duty cycle of circuitry within the cellular transceiver 110, the invention is not limited thereto and may be applied to regulate the power-on to power-off duty cycle of other communication circuitry.

The cellular transceiver 110 can include a RF transmitter circuit 112 and a RF receiver circuit 114. The controller circuit 140 can be configured to repetitively switch power on and off to the RF transmitter 112 and the RF receiver 114. The communication terminal 100 can separately control power to the RF transmitter 112 relative to the RF receiver 114 so that the RF receiver 114 can be powered-on while the RF transmitter 112 remains powered-off, and/or so that the RF transmitter 112 can be powered-on while the RF receiver 114 remains powered-off.

The controller 140 can generate a signal that controls a power switch to toggle between connecting and disconnecting power to the entire cellular transceiver 110, or may generate one signal 111a that controls a switch to toggle power on-off to the RF transmitter 112 and may independently generate another signal 111b that controls another switch to toggle power on-off to the RF receiver 114.

The communication terminal 100 further includes a movement sensor 150 that is configured to sense movement of the communication terminal 100, and which may determine the distance that the communication terminal 100 has moved from a previous location. The movement sensor 150 may include a GPS receiver circuit 152, an acceleration sensor circuit 154, an ambient pressure sensor circuit 156, an ambient light sensor circuit 158, and/or other circuitry that can detect movement of the communication terminal 100.

The other circuitry of the movement sensor 150 may, for example, determine that the communication terminal 100 has moved based on signals received from the cellular network, such as from a location assistance unit 126. The location assistance unit 126 may generate position assistance information which is communicated through the base station 120 to the communication terminal 100. The location assistance unit 126 may, for example, determine a location of the communication terminal 100 based on triangulation of signals transmitted by the communication terminal 100 and received by a plurality of the base stations 120 having known locations. Alternatively or additionally, the location assistance unit 126 may cause position assistance information, such as timing signals and associated base station location information, to be transmitted through a plurality of the base stations 120 to the communication terminal 100, so that the movement sensor 150 can triangulate its location therefrom.

The movement sensor 150 may additionally or alternatively determine that the communication terminal 100 has moved based on the WLAN/Bluetooth transceiver 116 discovering the presence/absence of signals from certain other communication devices.

Although the GPS receiver circuit 152, the acceleration sensor circuit 154, the ambient pressure sensor circuit 156, and the ambient light sensor circuit 158 are illustrated as being separate from the controller 140, it is to be understood that at least some of their functionality described herein may be embodied within the controller 140 or vice versa.

In accordance with some embodiments, the controller 140 manages power consumption by the cellular transceiver 110 by regulating the power-on and power-off duty cycle of various components of the cellular transceiver 110, including, without limitation, the RF transmitter 112 and/or the RF receiver 114 in response to a signal from the movement sensor 150 indicating movement of the communication terminal 100. The controller 140 may filter the signal from the movement sensor 150 to remove noise and/or systematic errors (e.g., signal drifting or other false indications of movement over time).

For example, while the communication terminal 100 is remaining relatively stationary (e.g., while left unattended in a car or on a table), the movement sensor 150 can generate a signal that indicates lack of movement or a lack of a threshold amount of movement from a previous location (e.g., movement that is less than a threshold distance) during a threshold time. The controller 140 can respond to the signal by decreasing the power-on to power-off duty cycle of the RF transmitter 112 and/or the RF receiver 114 to reduce power consumption.

In response to the movement sensor 150 sensing movement, such as movement across a threshold distance, the controller 140 can respond by automatically increasing the power-on to power-off duty cycle of the RF transmitter 112 and/or the RF receiver 114 to enable more frequent receipt and/or transmission of communication signals from/to the cellular network.

Figure 2:
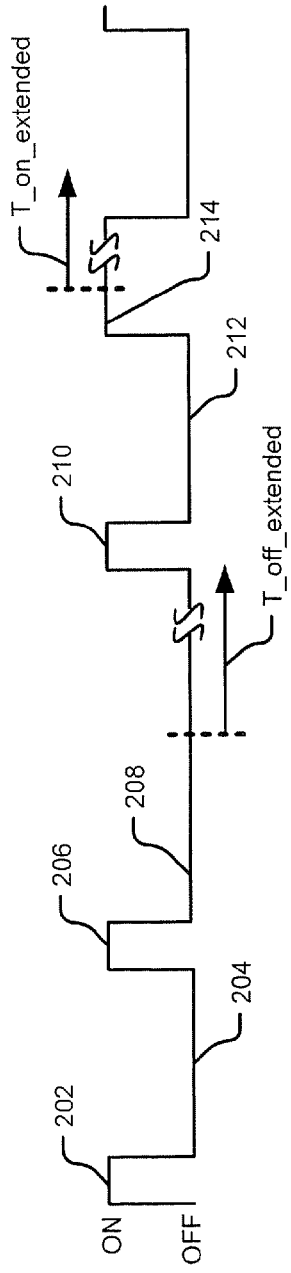
FIG. 2 is a timing diagram illustrating exemplary operations and methods for controlling the power-on to power-off duty cycle of the transmitter circuitry and/or the receiver circuitry of FIG. 1 in accordance with some embodiments of the present invention.

FIG. 2 is a timing diagram that illustrates exemplary operations and methods for controlling the power-on to power-off duty cycle of the RF transmitter circuitry 112 and/or the RF receiver circuitry 114 of FIG. 1 in accordance with some embodiments of the present invention. Referring to FIG. 2, the RF transmitter 112 and/or the RF receiver circuitry 114 are powered-on for a first duration 202, powered-off for second duration 204, and then powered-on for a third duration 206. The relative lengths of the first, second, and third durations 202, 204, and 206 (i.e., the power-on to power-off duty cycle) are regulated in response to various trigger events, which are described further below. For example, the RF transmitter 112 and/or the RF receiver circuitry 114 is maintained powered-off during a fourth duration 208 for an extended time (T_off_extended), thereby decreasing the power-on to power-off duty cycle.

As will be described below with regard to FIG. 4, the RF transmitter 112 and/or the RF receiver circuitry 114 may be powered-off, and may be maintained powered-off for an increased duration (e.g., decreased power-on to power-off duty cycle) in response to trigger events such as, for example, the communication terminal 100 remaining substantially stationary, having less than a threshold velocity, discovering absence of a previously discovered WLAN and/or Bluetooth device, and/or discovering presence of a WLAN and/or Bluetooth device that is known to be associated with a previously observed location where the communication terminal 100 remained stationary.

In response to the trigger events described below, the RF transmitter 112 and/or the RF receiver circuitry 114 is powered-on for a fifth duration 210 and is then powered-off for a sixth duration 212. As shown, the RF transmitter 112 and/or the RF receiver circuitry 114 is maintained powered-on during a seventh duration 214 for an extended time (T_on_extended), thereby increasing the power-on to power-off duty cycle.

Similarly, the RF transmitter 112 and/or the RF receiver circuitry 114 may be powered-on, and may be maintained powered-on for an increased duration (e.g., increased power-on to power-off duty cycle) in response to trigger events such as, for example, the communication terminal 100 traveling at least a threshold distance from a previous position, having at least a threshold velocity, discovering a new WLAN and/or Bluetooth device, discovering absence of signals from the previously discovered WLAN and/or Bluetooth device that is known to be associated with a previously observed location where the mobile terminal remained stationary.

As described above, the communication terminal 100 can separately control power to the RF transmitter 112 relative to the RF receiver 114 so that the RF receiver 114 can be powered-on while the RF transmitter 112 remains powered-off, or so that the RF transmitter 112 can be powered-on while the RF receiver 114 remains powered-off.

In some embodiments, the controller 140 maintains the RF transmitter circuit powered-off when in the sleep mode responsive to determining that it has moved less than a threshold distance from a previous location, and can repetitively switch power-on and power-off to the RF transmitter 112 when in the active mode responsive to determining that it has moved more than the threshold distance from the previous location. While in the sleep mode, the controller 140 can also maintain the power-on to power-off duty cycle of the RF receiver 114 below a defined level, and while in the active mode the controller 140 can maintain the power-on to power-off duty cycle of the RF receiver circuit above the defined level.

In some other embodiments, the controller 140 responds to a determination that the communication terminal 100 has moved less than a threshold distance from a previous location by separately controlling the power-on to power-off duty cycle of the RF transmitter 112 relative to the RF receiver 114 to cause the RF transmitter 112 to cycle between power-on and power-off at a lower rate than the RF receiver 114. The controller 140 may cause the RF transmitter 112 and the RF receiver 114 to be concurrently powered-on during intervals that repeat at a defined rate.

Figure 3:
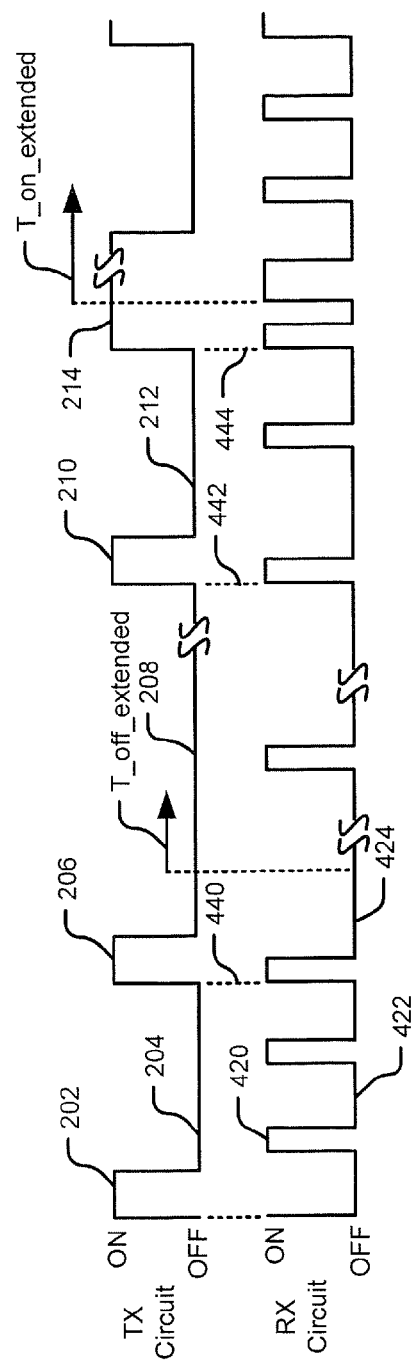
FIG. 3 is a timing diagram illustrating exemplary operations and methods for controlling the relative timing of the different power-on to power-off duty cycles of the transmitter circuitry and the receiver circuitry of FIG. 1 in accordance with some embodiments of the present invention.

FIG. 3 is a timing diagram illustrating exemplary operations and methods for controlling the relative timing of the different power-on to power-off duty cycles of the RF transmitter 112 ("TX circuit") and the RF receiver 114 ("RX circuit") of FIG. 1 in accordance with some embodiments of the present invention. Referring to FIG. 3, the illustrated RF transmitter 112 has the same power-on to power-off duty cycle as shown in FIG. 2 and, therefore, uses the same reference numbers. In contrast, the RF receiver 114 is cycled on and off at a higher rate than the RF transmitter 112, and may be maintained on for shorter durations than the RF transmitter 112 during at least some of the power-on cycles.

For example, during at least a portion of time that the RF receiver 114 is powered on during the sleep mode (and while the RF transmitter 112 may be powered off), the controller 140 can monitor a control channel from the cellular network for incoming paging messages that are indicative of incoming calls to the communication terminal 100.

As shown in FIG. 3, the controller 140 can concurrently power-on the RF transmitter 112 and the RF receiver 114 at intervals occurring at exemplary times 440, 442, and 444 to enable the controller 140 to bidirectionally communicate with the cellular network. During these concurrent intervals, the controller 140 may, for example, receive downlink timing information via the RF receiver 114 from one or more base stations of the cellular network, generating uplink timing alignment information in response to the received timing information, and then transmitting the uplink timing alignment information via the RF transmitter 112 to the cellular network.

Alternatively or additionally, during these concurrent intervals, the controller 140 can search for new cellular base station identifiers that are within range of the RF receiver 114, and can monitor the strength of signals received from surrounding base stations to carry out handover decisions. The cell search may be carried-out according to one or more cellular communication protocols and may include bidirectional communications between the communication terminal 101 or cellular base stations. Cell search may be initiated by the communication terminal 100, such as in response to signal strength from one or more base stations falling below a threshold level and/or may be carried out in response to a command received from the cellular network. The controller 140 can maintain the rate at which the cell searches are carried-out below a threshold rate in response to determining that it has moved less than the threshold distance from the previous location, and can maintain the cell search rate above the threshold rate in response to determining that it has moved more than the threshold distance from the previous location.

The power-on to power-off duty cycles of the RF transmitter 112 and the RF receiver 114 can be increased and decreased in response to various trigger events, which are described further below with regard to FIG. 4. Thus, in a similar manner to that described above for FIG. 2, the RF receiver circuitry 114 is repetitively powered-on for a first duration 420 and powered-off for second duration 422 while the RF transmitter 112 is maintained powered-off, and then, at time 440, is powered-on at the same time as the RF transmitter 112. The RF receiver 114 is maintained powered-off during a fourth duration 424 for an extended time (T_off_extended), thereby decreasing the power-on to power-off duty cycle, in response to a trigger event.

As shown in FIG. 3, the power-on to power-off duty cycle can be regulated to have a different ratio following the extended time (T_off extended), and at time 444 the RF receiver 114 is powered-on concurrently with the RF transmitter 112 to enable bidirectional communications with the cellular network. The RF transmitter 112 and the RF receiver 114 are maintained powered-on during duration 214 for an extended time (T_on_extended), thereby increasing the power-on to power-off duty cycle, in response to a trigger event to enable longer bidirectional communications with the cellular network.

Although various embodiments have been described in the context of controlling the power-on to power-off duty cycle of the transmitter and receiver circuitry, it is to be understood that such control can include controlling the timing for when operations are carried out that involve using the transmitter circuitry 112 and/or the receiver circuitry 114 in response to movement of the terminal 100. Such control of the timing of operations is now described with regard to the exemplary timing diagram of FIG. 4 that shows the frequency at which various exemplary operations are carried out.

Figure 4:
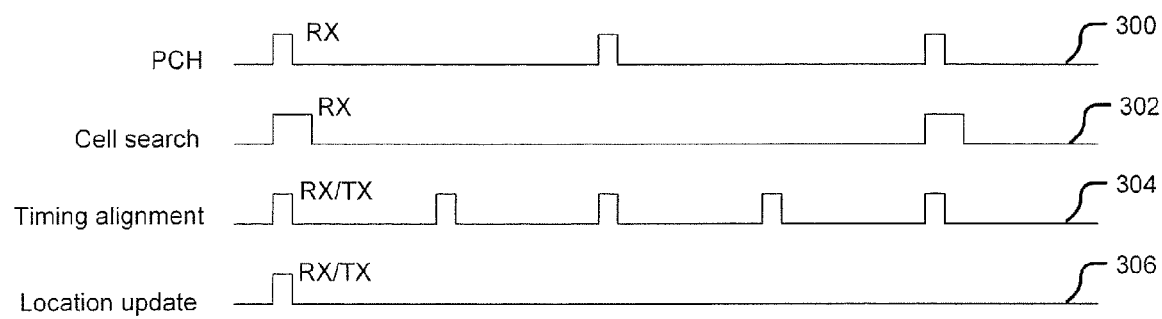
FIG. 4 is a timing diagram that illustrates how the timing of operations that involve using the transmitter circuitry and/or the receiver circuitry of FIG. 1 can be controlled in accordance with some embodiments of the present invention.

Referring to FIG. 4, when the terminal 100 is not moving (e.g., no movement or less than a threshold amount of movement), certain operations do not need to be carried out as frequently as when the terminal 100 is moving. Accordingly, the repetition interval at which various operations are carried out can be controlled in response to movement of the terminal 100. For example, the interval between repetitive paging response operations (line 300) that monitor the paging channel (PCH) for incoming pages, of cell search operations (line 302) that search for adjacent base stations, of timing alignment operations (line 304) that receive signals from a base station and transmit timing alignment information to the base station, and/or location update operations (line 306) that receive and transmit signals that are used to determine a geographic location of the terminal 100 can be decreased in response to movement (e.g., at least a threshold amount of movement and/or speed) and can be increased in response to lack of movement (e.g., less than the threshold movement and/or speed). Moreover, the number of base stations that are tracked during cell search and/or timing alignment can be controlled in response to movement of the terminal, such by decreasing the number of tracked base stations when the terminal is not moving or is moving slowly and by increasing the number of tracked base stations when the terminal is moving or is moving more quickly.

Each of the operations 300-306 can have different repetition intervals which can be changed different relative amounts responsive to sensing terminal movement. However, the repetition intervals may be integer multiples of a common time period (sub cycles of each other) so that the operations can overlap at least at some times to concurrently require powering-on of the transmitter 112 and/or the receiver 114 circuitry. For example, the operation to monitor the paging channel may have a fixed repetition interval, while the repetition interval of other operations may be varied as integer multiples of the paging channel operations. The cell search operation depends on handoff requirement and, therefore, can have a relatively long repetition interval. In contrast, the timing alignment operation depends on the timing accuracy requirement in the uplink and can be much more stringent for OFDM systems like WiMAX and LTE than for GSM, and may therefore may be required to be carried out with much shorter repetition intervals.

The operation to monitor the paging channel may have an interval of one second, while the cell search operation can be longer (e.g., several seconds to tens of second when no terminal movement is sensed). The timing alignment operation may have a repetition interval of hundreds of ms for OFDM systems and a bit longer for slotted systems like GSM. The location update operation is more of a presence indication and may have a repetition interval of tens of minutes to hours.

Figure 5:
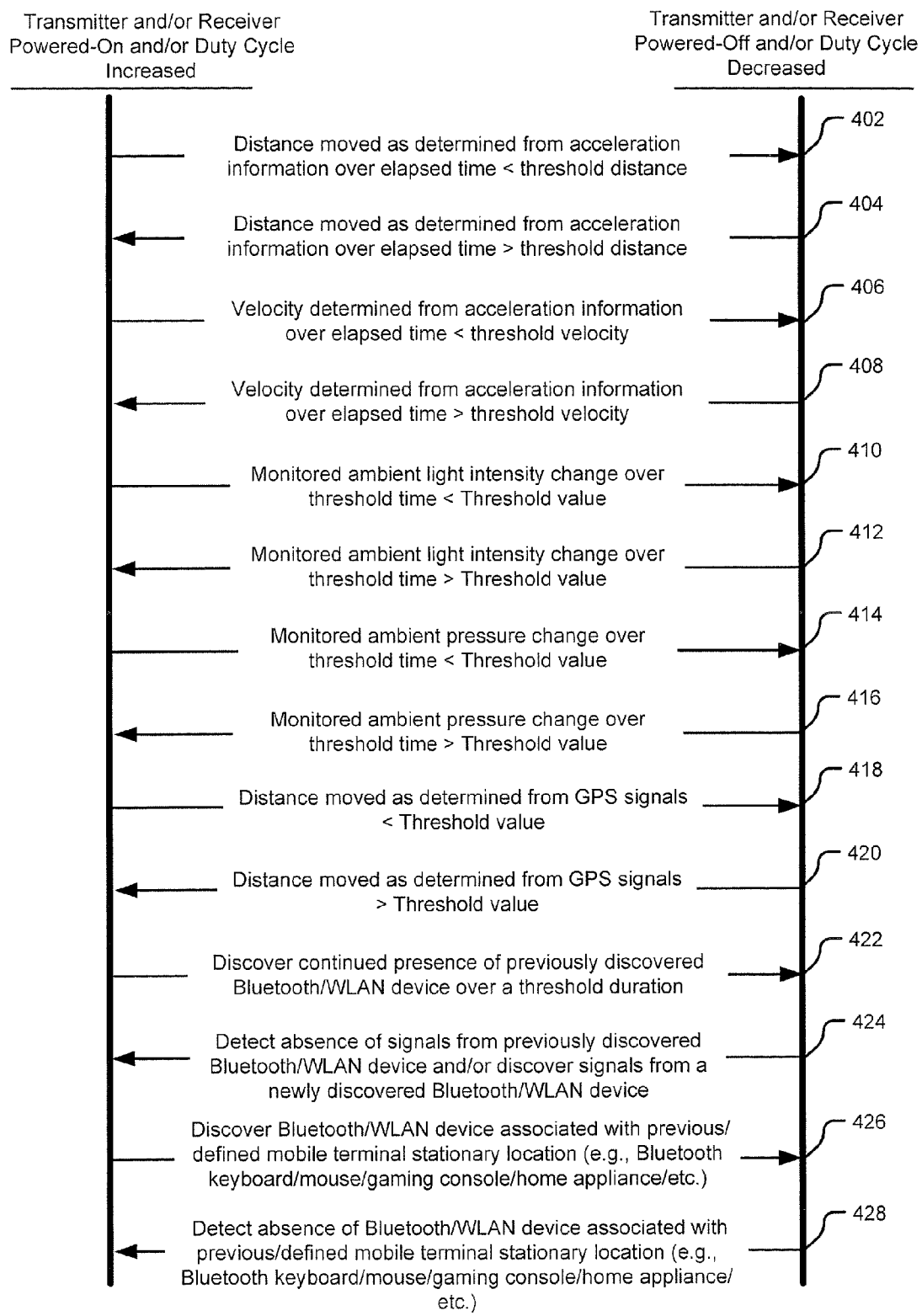
FIG. 5 is an event diagram showing trigger events and associated operations and methods that trigger powering-on/powering-off the transmitter circuitry and/or the receiver circuitry of FIG. 1, and/or trigger the controller to increase/decrease the power-on to power-off duty cycle of the transmitter circuitry and/or the receiver circuitry in accordance with some embodiments of the invention.

FIG. 5 is an event diagram showing trigger events and associated operations and methods that trigger powering-on/powering-off the RF transmitter 112 and/or the RF receiver 114 of FIG. 1, and/or that trigger the controller 140 to increase/decrease the power-on to power-off duty cycle of the RF transmitter 112 and/or the RF receiver 114 in accordance with some embodiments of the invention.

Referring to FIGS. 1 and 2, the controller 140 may respond to one or more of the defined trigger events by carrying-out a single defined action of powering-on or powering-off the RF transmitter 112 and/or the RF receiver 114. Alternatively or additionally, the controller 140 may repetitively power-on and power-off the RF transmitter 112 and/or the RF receiver 114 and regulate (increase/decrease) the power-on to power-off duty cycle (i.e., ratio of the power-on duration to the power-off duration) of the RF transmitter 112 and/or the RF receiver 114 in response to one or more of the trigger events.

The acceleration sensor 154 can sense vibration and may determine therefrom the distance that the communication terminal 100 has moved from a previous location. For example, the controller 140 can double integrate the acceleration signal over time to determine the communication terminal's location. The acceleration sensor 154 may include at least a two-axis accelerometer to sense acceleration in at least two directions that can be parallel to at least a two dimensional direction of travel of the communication terminal 100. Because the communication terminal 100 may be held at various angles relative to ground, it may include a three-axis accelerometer, or a two-axis accelerometer and a tilt sensor, which enable the controller 140 to determine the distance traveled along the ground irrespective of what angle the communication terminal 100 is held relative to the ground.

Referring to trigger event 402, the controller 140 can respond to acceleration information from the acceleration sensor 154 indicating that the communication terminal 100 has not moved more than a threshold distance by powering-off the RF transmitter 112 and/or the RF receiver 114. When the RF transmitter 112 and/or the RF receiver 114 are being repetitively cycled on and off, the controller 140 may decrease the power-on to power-off duty cycle by extending the power-off time of the RF transmitter 112 and/or the RF receiver 114 and/or by decreasing the power-on time.

In contrast, referring to trigger event 404, the controller 140 can respond to the acceleration information from the acceleration sensor 154 indicating that the communication terminal 100 has moved more than the threshold distance by turning-on the RF transmitter 112 and/or the RF receiver 114. When the RF transmitter 112 and/or the RF receiver 114 are being repetitively cycled on and off, the controller 140 can increase the power-on to power-off duty cycle of the RF transmitter 112 and/or the RF receiver 114 by decreasing the power-off time of the RF transmitter 112 and/or the RF receiver 114 and/or increasing the power-on time.

The threshold distance need not be static, as it may be regulated by the controller 140 to vary in response to, for example, velocity of the communication terminal 100, length of time that the communication terminal has been operating in either the lower power sleep mode and/or the active mode, the number of base stations within range of the RF receiver 114, the strength of signals received from adjacent base stations, and/or other defined conditions. The threshold distance used for comparison for trigger event 402 may or may not be the same as that used for trigger event 404.

The controller 140 can regulate power to the RF transmitter 112 and/or the RF receiver 114 in response to velocity of the communication terminal 100. The controller 140 can determine velocity from the acceleration information (i.e., velocity can be determined from a single integration of acceleration information over time). Referring to trigger event 406, when the velocity is less than a threshold velocity, the controller 140 can power-off the RF transmitter 112 and/or the RF receiver 114 and/or, when repetitively cycling the RF transmitter 112 and/or the RF receiver 114 on and off, can decrease the power-on to power-off duty cycle of the RF transmitter 112 and/or the RF receiver 114.

In contrast, referring to trigger event 408, when the velocity is greater than a threshold velocity, the controller 140 can power-on the RF transmitter 112 and/or the RF receiver 114 and/or, when repetitively cycling the RF transmitter 112 and/or the RF receiver 114 on and off, can increase the power-on to power-off duty cycle. Accordingly, the RF transmitter 112 and/or the RF receiver 114 can be maintained powered-off when the communication terminal 100 is substantially stationary, and can be repetitively cycled on and off when the RF transmitter 112 and/or the RF receiver 114 is moving. The RF transmitter 112 and/or the RF receiver 114 can be maintained powered-off for longer periods of time when the communication terminal 100 is being carried by a person who is walking slowly, and it can be maintained powered-off for shorter periods of time when the communication terminal 100 is within a faster moving car.

The threshold velocity need not be static, as it may be regulated by the controller 140 to vary in response to, for example, velocity of the communication terminal 100, length of time that the communication terminal has been operating in either the lower power sleep mode and/or the active mode, the number of base stations within range of the RF receiver 114, the strength of signals received from adjacent base stations, and/or other defined conditions. The threshold velocity used for comparison for trigger event 406 may or may not be the same as that used for trigger event 408.

The ambient light sensor circuit 158 generates a signal that is indicative of the amount of light that is incident thereto. The controller 140 regulates the power-on to power-off duty cycle of the RF transmitter 112 and/or the RF receiver 114 in response to the sensed change in ambient light level.

Referring to trigger event 410, when the level of ambient light changes less than a threshold amount during a threshold time, the controller 140 can power-off the RF transmitter 112 and/or the RF receiver 114 and/or, when repetitively cycling the RF transmitter 112 and/or the RF receiver 114 on and off, can decrease the power-on to power-off duty cycle of the RF transmitter 112 and/or the RF receiver 114.

In contrast, referring to trigger event 412, when the level of ambient light changes more than the threshold amount during the threshold time, the controller 140 can power-on the RF transmitter 112 and/or the RF receiver 114 and/or, when repetitively cycling the RF transmitter 112 and/or the RF receiver 114 on and off, can increase the power-on to power-off duty cycle of the RF transmitter 112 and/or the RF receiver 114.

The controller 140 may thereby detect when the communication terminal 100 is carried outside from a building and/or shadows moving across the light sensor 158 as it is actively carried by a person or transported in a car.

The threshold intensity amount need not be static, as it may be regulated by the controller 140 to vary in response to, for example, velocity of the communication terminal 100, length of time that the communication terminal has been operating in either the lower power sleep mode and/or the active mode, the number of base stations within range of the RF receiver 114, the strength of signals received from adjacent base stations, and/or other defined conditions. The threshold intensity amount and the threshold time used for comparison for trigger event 410 may or may not be the same as that used for trigger event 412.

The ambient pressure sensor circuit 156 generates a signal that is indicative of the change in level of ambient air pressure. The controller 140 regulates the power-on to power-off duty cycle of the RF transmitter 112 and/or the RF receiver 114 in response to the sensed change in ambient pressure.

Referring to trigger event 414, when the level of ambient pressure changes less than a threshold amount during a threshold time, the controller 140 can power-off the RF transmitter 112 and/or the RF receiver 114 and/or, when repetitively cycling the RF transmitter 112 and/or the RF receiver 114 on and off, can decrease the power-on to power-off duty cycle of the RF transmitter 112 and/or the RF receiver 114.

In contrast, referring to trigger event 416, when the level of ambient pressure changes more than the threshold amount during the threshold time, the controller 140 can power-on the RF transmitter 112 and/or the RF receiver 114 and/or, when repetitively cycling the RF transmitter 112 and/or the RF receiver 114 on and off, can increase the power-on to power-off duty cycle of the RF transmitter 112 and/or the RF receiver 114.

The controller 140 may thereby detect when the communication terminal 100 is picked-up from a table (e.g., when the pressure sensor 156 is sufficiently sensitive), carried between floors in a building, subjected to a pressure change when a car door is opened/closed, and/or other events associated with air pressure changes. The pressure signal may be filtered by the controller 140 to avoid erroneously sensing normal weather changes as being indicative of movement of the communication terminal 100.

The threshold pressure amount need not be static, as it may be regulated by the controller 140 to vary in response to, for example, velocity of the communication terminal 100, length of time that the communication terminal has been operating in either the lower power sleep mode and/or the active mode, the number of base stations within range of the RF receiver 114, the strength of signals received from adjacent base stations, and/or other defined conditions. The threshold pressure amount and the threshold time used for comparison for trigger event 414 may or may not be the same as that used for trigger event 416.

The GPS receiver 152 can determine in a well-known manner the distance that the communication terminal 100 has moved from a previous location in response signals received from a constellation of GPS satellites 105. The controller 140 regulates the power-on to power-off duty cycle of the RF transmitter 112 and/or the RF receiver 114 in response to the determined distance that the communication terminal 100 has moved.

Referring to trigger event 418, when the determined distance is less than a threshold value, the controller 140 can power-off the RF transmitter 112 and/or the RF receiver 114 and/or, when repetitively cycling the RF transmitter 112 and/or the RF receiver 114 on and off, can decrease the power-on to power-off duty cycle of the RF transmitter 112 and/or the RF receiver 114.

In contrast, referring to trigger event 420, when the determined distance is more than a threshold value, the controller 140 can power-on the RF transmitter 112 and/or the RF receiver 114 and/or, when repetitively cycling the RF transmitter 112 and/or the RF receiver 114 on and off, can increase the power-on to power-off duty cycle of the RF transmitter 112 and/or the RF receiver 114.

As described above with regard to events 402 and 404, the threshold distance need not be static, as it may be regulated by the controller 140. The threshold distance used for comparison for trigger event 418 may or may not be the same as that used for trigger event 420.

With reference to FIG. 2, the WLAN and/or Bluetooth transceiver 240 encodes/decodes and controls communications according to one or more short range communication protocols, which may include, but are not limited to, Bluetooth and/or WiFi such as IEEE 802.11 (e.g., IEEE 802.11b-g). The WLAN/Bluetooth transceiver 240 can discover the presence of RF signals from the WLAN communication device 132 and/or the Bluetooth communication device 130, and can detect the subsequent absence of those RF signals indicating that the mobile terminal 100 may have moved beyond their communication range. The WLAN communication device 132 and/or the Bluetooth communication device 130 may be included within, for example, a desktop computer, wireless mouse/keyboard, network router, gaming console/controller, and/or home appliance. The transceiver 116 may alternatively or additionally be configured to communicate via near field communication (NFC) signals and/or via other short range communication signals (e.g., ultra-wideband communication signals, Zigbee, wireless HDMI).

The controller 140 can detect movement of the communication terminal 100 in response to the presence or absence of signals from one or more separate Bluetooth and/or the WLAN devices. Referring to trigger event 422, the controller 140 can power-off the RF transmitter 112 and/or the RF receiver 114 in response to the transceiver 116 detecting the continued presence of a discovered WLAN/Bluetooth device over a threshold duration and/or, when repetitively cycling the RF transmitter 112 and/or the RF receiver 114 on and off, can decrease the power-on to power-off duty cycle of the RF transmitter 112 and/or the RF receiver 114.

In contrast, with reference to trigger event 424, the controller 140 can respond to the transceiver 116 detecting absence of signals from the previously discovered Bluetooth/WLAN device and/or can respond to the transceiver 116 detecting the presence of signals from a newly discovered Bluetooth/WLAN device by powering-on the RF transmitter 112 and/or the RF receiver 114 and/or, when repetitively cycling the RF transmitter 112 and/or the RF receiver 114 on and off, by increasing the power-on to power-off duty cycle of the RF transmitter 112 and/or the RF receiver 114.

The controller can detect movement of the communication terminal 100 in response to signals from a WLAN device and/or a Bluetooth device that is known to be associated with a previously determined location where the communication terminal remained substantially stationary for at least a threshold time. Referring to trigger event 426, the controller can power-off the RF transmitter 112 and/or the RF receiver 114 in response to the transceiver 116 detecting the presence of signals from a WLAN device and/or a Bluetooth device that is known to be associated with a previously determined location where the communication terminal remained substantially stationary for at least a threshold time, and/or, when repetitively cycling the RF transmitter 112 and/or the RF receiver 114 on and off, the controller 140 can decrease the power-on to power-off duty cycle of the RF transmitter 112 and/or the RF receiver 114.

In contrast, with reference to trigger event 428, the controller 140 can power-on the RF transmitter 112 and/or the RF receiver 114 in response to the transceiver 116 detecting the presence of signals from a WLAN device and/or a Bluetooth device that is known to be associated with a previously determined location where the communication terminal remained substantially stationary for at least a threshold time, and/or, when repetitively cycling the RF transmitter 112 and/or the RF receiver 114 on and off, the controller 140 can increase the power-on to power-off duty cycle of the RF transmitter 112 and/or the RF receiver 114.

The controller 140 may be configured to learn the association between discovery of RF signals from an identified WLAN device and/or from an identified Bluetooth device and the subsequent stationary resting of the mobile terminal 100 for at least a threshold time. The identity of various WLAN devices and/or Bluetooth devices that are associated with stationary locations of the mobile terminal 100 can be defined by a user via the keypad 162 and/or via another user interface of the mobile terminal 100. In response to that identification and associated expectation that the mobile terminal 100 will remain substantially stationary for at least a threshold time, the controller 140 can conserve power by powering-down the RF transmitter 112 and/or the RF receiver 114 for at least a defined duration and/or decreasing its power-on to power-off duty cycle.

By way of example, when the mobile terminal 100 arrives at a home location, the WLAN/Bluetooth transceiver 116 can discover the presence of a known WLAN router and/or a Bluetooth device within the home that is identified by the controller circuit 140 as been located at the home location. Exemplary WLAN/Bluetooth devices that may be recognized as being at a home location can include, but are not limited to, a WLAN/Bluetooth communication capable desktop computer, wireless mouse/keyboard, network router, gaming console/controller, and/or home appliance.

The controller 140 may respond to any combination of the trigger events described herein and/or in combination with other defined events that are indicative of movement of the communication terminal 100. For example, the controller 140 may respond to a threshold level of vibration indicated by the acceleration signal by powering-on the GPS receiver 152 to obtain a positional update and, when the GPS derived position indicates that the communication terminal 100 has moved at least a threshold distance, then the controller 140 can turn-on the RF transmitter 112 and/or the RF receiver 114 and/or increase their power-on duty cycle.

In the drawings and specification, there have been disclosed embodiments of the invention and, although specific terms are employed, they are used in a generic and descriptive sense only and not for purposes of limitation, the scope of the invention being set forth in the following claims.

What is claimed is:
1. A method for regulating power in a wireless communication terminal, the method comprising:
   repetitively switching power-on and power-off to a RF transmitter circuit and/or a RF receiver circuit;
   sensing movement by the wireless communication terminal from a previous location; and
   regulating the power-on to power-off duty cycle of the RF transmitter circuit and/or the RF receiver circuit in response to the sensed movement, wherein:
   the RF transmitter circuit is configured to encode and transmit a signal according to at least one cellular communication protocol;
   the RF receiver circuit is configured to receive and decode a signal according to the at least one cellular communication protocol;
   sensing movement comprises searching for signals from WLAN devices; and
   regulation of the power-on to power-off duty cycle of the RF transmitter circuit and/or the RF receiver circuit comprises:
   increasing the power-on to power-off duty cycle in response to newly discovered signals from a WLAN device that is separate from the communication terminal; and
   decreasing the power-on to power-off duty cycle in response to detecting absence of signals from the previously discovered WLAN device.

2. A method for regulating power in a wireless communication terminal, the method comprising:
   repetitively switching power-on and power-off to a RF transmitter circuit and/or a RF receiver circuit;
   sensing movement by the wireless communication terminal from a previous location; and
   regulating the power-on to power-off duty cycle of the RF transmitter circuit and/or the RF receiver circuit in response to the sensed movement, wherein:
   the RF transmitter circuit is configured to encode and transmit a signal according to at least one cellular communication protocol;
   the RF receiver circuit is configured to receive and decode a signal according to the at least one cellular communication protocol;
   sensing movement comprises searching for signals from Bluetooth devices; and
   regulation of the power-on to power-off duty cycle of the RF transmitter circuit and/or the RF receiver circuit comprises:
   increasing the power-on to power-off duty cycle in response to newly discovered signals from a Bluetooth device that is separate from the communication terminal; and
   decreasing the power-on to power-off duty cycle in response to detecting absence of signals from the previously discovered Bluetooth device.

3. A method for regulating power in a wireless communication terminal, the method comprising:
   repetitively switching power-on and power-off to a RF transmitter circuit and/or a RF receiver circuit;
   sensing movement by the wireless communication terminal from a previous location; and regulating the power-on to power-off duty cycle of the RF transmitter circuit and/or the RF receiver circuit in response to the sensed movement, wherein:

the RF transmitter circuit is configured to encode and transmit a signal according to at least one cellular communication protocol;

the RF receiver circuit is configured to receive and decode a signal according to the at least one cellular communication protocol;

sensing movement comprises searching for signals from WLAN devices and/or Bluetooth devices; and regulation of the power-on to power-off duty cycle of the RF transmitter circuit and/or the RF receiver circuit comprises:

decreasing the power-on to power-off duty cycle in response to discovering signals from a WLAN device and/or a Bluetooth device that is known to be associated with a previously determined location where the communication terminal remained substantially stationary for at least a threshold time; and increasing the power-on to power-off duty cycle in response to detecting absence of signals from the previously detected WLAN device and/or the Bluetooth device.

4. A method for regulating power in a wireless communication terminal, the method comprising:

repetitively switching power-on and power-off to a RF transmitter circuit and/or a RF receiver circuit;

sensing movement by the wireless communication terminal from a previous location; and regulating the power-on to power-off duty cycle of the RF transmitter circuit and/or the RF receiver circuit in response to the sensed movement, wherein repetitively switching power-on and power-off to a RF transmitter circuit and/or a RF receiver circuit comprises:

maintaining the RF transmitter circuit powered-off in response to the communication terminal determining that it has moved less than a threshold distance from a previous location;

repetitively switching power-on and power-off to the RF transmitter circuit in response to the communication terminal determining that it has moved more than the threshold distance from the previous location;

maintaining the power-on to power-off duty cycle of the RF receiver circuit below a defined level in response to the communication terminal determining that it has moved less than the threshold distance from the previous location; and maintaining the power-on to power-off duty cycle of the RF receiver circuit above the defined level in response to the communication terminal determining that it has moved more than the threshold distance from the previous location.

5. A method for regulating power in a wireless communication terminal, the method comprising:

repetitively switching power-on and power-off to a RF transmitter circuit and/or a RF receiver circuit;

sensing movement by the wireless communication terminal from a previous location;

regulating the power-on to power-off duty cycle of the RF transmitter circuit and/or the RF receiver circuit in response to the sensed movement; and in response to the communication terminal determining that it has moved less than a threshold distance from a previous location, separately controlling the power-on to power-off duty cycle of the RF transmitter circuit relative to the RF receiver circuit to cause the RF transmitter circuit to cycle between power-on and power-off at a lower rate than the RF receiver circuit.

6. The method of claim 5, further comprising:

in response to the communication terminal determining that it has moved less than the threshold distance from the previous location, controlling the power-on to power-off duty cycle of the RF transmitter circuit to cause the RF transmitter circuit and the RF receiver circuit to be concurrently powered-on during intervals that repeat at a defined rate.

7. The method of claim 5, further comprising:

maintaining a cell search rate, at which the communication terminal searches for new cellular base station identifiers that are within range of the RF receiver circuit, below a threshold rate in response to the communication terminal determining that it has moved less than the threshold distance from the previous location; and maintaining the cell search rate above the threshold rate in response to the communication terminal determining that it has moved more than the threshold distance from the previous location.

8. The method of claim 5, further comprising:

controlling one or more repetition timing intervals for carrying out operations to monitor a paging channel, cell search operations, timing alignment operations, and/or location update operations in response to the sensed movement of the wireless communication terminal.

9. The method of claim 5, further comprising:

controlling a number of base stations that are tracked by the wireless communication terminal in response to the sensed movement of the wireless communication terminal.

10. A wireless communication terminal comprising:

a RF transmitter circuit that is configured to transmit signals to a cellular base station;

a RF receiver circuit that is configured to receive signals from the cellular base station;

a movement sensor that is configured to sense distance moved by the wireless communication terminal from a previous location in response to an acceleration signal from an accelerometer, a position signal from a GPS receiver, a light level signal from an ambient light sensor, and/or a pressure level signal from a pressure sensor; and a controller circuit that is configured to repetitively switch power-on and power-off to the RF transmitter and receiver circuits, to decrease the power-on to power-off duty cycle of the RF transmitter and receiver circuits in response to determining that the sensed distance is less than a threshold distance, to increase the power-on to power-off duty cycle of the RF transmitter and receiver circuits in response to determining that the sensed distance is more than the threshold distance, to separately control the power-on to power-off duty cycle of the RF transmitter circuit relative to the RF receiver circuit to cause the RF transmitter circuit to cycle between power-on and power-off at a lower rate than the RF receiver circuit and to cause the RF transmitter circuit and the RF receiver circuit to be concurrently powered-on during intervals that repeat at a defined rate while the sensed distance is less than the threshold distance.

* * * * *